(12) United States Patent
Zhong et al.

(10) Patent No.: US 8,553,046 B2
(45) Date of Patent: Oct. 8, 2013

(54) THIN-LINE DETECTION APPARATUS AND METHOD

(75) Inventors: Lefan Zhong, San Jose, CA (US); Abdulkadir Utku Diril, San Jose, CA (US)

(73) Assignee: Vivante Corporation, Sunnyvale, CA (US)

( * ) Notice: Subject to any disclaimer, the term of this patent is extended or adjusted under 35 U.S.C. 154(b) by 997 days.

(21) Appl. No.: 11/938,223

(22) Filed: Nov. 9, 2007

(65) Prior Publication Data

US 2009/0122076 A1    May 14, 2009

(51) Int. Cl.
    *G09G 5/00*    (2006.01)
(52) U.S. Cl.
    USPC ......................................... 345/611; 345/643
(58) Field of Classification Search
    USPC .................. 345/611, 670; 715/234
    See application file for complete search history.

(56) References Cited

U.S. PATENT DOCUMENTS

| | | | |
|---|---|---|---|
| 5,140,315 A | 8/1992 | Edelson | |
| 6,137,918 A | 10/2000 | Harrington | |
| 6,167,166 A * | 12/2000 | Loce et al. | 382/266 |
| 6,608,942 B1 | 8/2003 | Le | |
| 6,847,738 B1 | 1/2005 | Scognamiglio | |
| 7,164,430 B2 | 1/2007 | Jiao | |
| 2001/0019334 A1* | 9/2001 | Carrai et al. | 345/670 |
| 2002/0076121 A1* | 6/2002 | Shimizu et al. | 382/300 |
| 2003/0071827 A1* | 4/2003 | Wang | 345/611 |
| 2007/0002080 A1* | 1/2007 | Ishizaka | 345/660 |
| 2007/0089051 A1* | 4/2007 | Madan | 715/234 |
| 2008/0074699 A1* | 3/2008 | Washio | 358/2.99 |

* cited by examiner

*Primary Examiner* — Phi Hoang
(74) *Attorney, Agent, or Firm* — David R. Stevens; Stevens Law Group (57) ABSTRACT

An apparatus and method for detecting and handling thin lines in a raster image includes reading depth values for each pixel of an n×m block of pixels surrounding a substantially central pixel. Differences are then calculated for selected depth values of the n×m block of pixels to yield multiple difference values. These difference values may then be compared with multiple pre-computed difference values associated with thin lines pre-determined to pass through the n×m block of pixels. If the difference values of the pixel block substantially match the difference values of one of the pre-determined thin lines, the pixel block may be deemed to describe a thin line. The apparatus and method may preclude application of an anti-aliasing filter to the substantially central pixel of the pixel block in the event it describes a thin line.

20 Claims, 11 Drawing Sheets

| P(0,0) | P(1,0) | P(2,0) |
| --- | --- | --- |
| P(0,1) | P(1,1) | P(2,1) |
| P(0,2) | P(1,2) | P(2,2) |

THIN-LINE DETECTION APPARATUS AND METHOD

BACKGROUND

This invention relates to three-dimensional (3D) graphics systems and more particularly to apparatus and methods for detecting thin lines in 3D graphics systems.

Aliasing refers to the distortions that occur when a computer graphic is rendered at a resolution other than the original resolution. Anti-aliasing refers to the techniques used to minimize the effects, or distortions, of aliasing. Anti-aliasing is a common technique to improve image quality for graphics and other image-based applications. There are many conventional methods to address image quality and the cost of anti-aliasing. Three of these conventional methods for full scene anti-aliasing in computer graphics applications are: accumulation buffer (A-buffer) anti-aliasing, supersample anti-aliasing, and multisample anti-aliasing (MSAA). A-buffer anti-aliasing uses an algorithm for polygon edge anti-aliasing. Since A-buffer anti-aliasing is not a complete solution to the aliasing problem, it is not widely used.

Supersample and multisample anti-aliasing are used for complete full-scene anti-aliasing. In computer graphics, full-scene anti-aliasing deals with the aliasing issues at the edge of an object and at the intersection of interpenetrating objects. Supersample anti-aliasing is implemented by rendering a scene at a higher resolution and then down-converting to a lower resolution output. In order to render the scene at a higher resolution, subsamples are used by taking more samples than would ordinarily be used for a single pixel. Mulitsample anti-aliasing is similar to supersample anti-aliasing, except that it is achieved at least partially through hardware optimization. In general, multisample anti-aliasing is less computationally complex than supersample anti-aliasing at the same performance and quality levels because of the hardware optimizations. Therefore, multisample anti-aliasing, instead of supersample anti-aliasing, is typically implemented in most modern computer graphics systems.

For supersample and multisample anti-aliasing, the quality of the image is highly dependent on the number of samples or subsamples used. Using a larger number of samples or subsamples gives a higher quality image. However, using a larger number of samples or subsamples consumes more memory resources for storing the samples. Additionally, using a larger number of samples or subsamples consumes significant computational resources of a central processing unit (CPU) or graphics processing unit (GPU).

Despite its advantages, anti-aliasing techniques tend to work best for relatively large areas having a uniform or substantially uniform color. Thin lines (e.g., lines having a width of one pixel or less), very small areas, very small fonts, or the like may tend to dissolve into the background (i.e., become blurry) when filtered by various anti-aliasing algorithms. Thus, it may be advisable to exclude thin lines or other small features from processing by anti-aliasing algorithms. In view of the foregoing, what are needed are apparatus and methods to efficiently detect thin lines so they may be excluded from processing by anti-aliasing algorithms.

BRIEF DESCRIPTION OF THE DRAWINGS

In order that the advantages of the invention will be readily understood, a more particular description of the invention will be rendered by reference to specific examples illustrated in the appended drawings. Understanding that these drawings depict only typical examples of the invention and are not therefore to be considered limiting of its scope, the invention will be described and explained with additional specificity and detail through use of the accompanying drawings, in which.

DETAILED DESCRIPTION

The invention has been developed in response to the present state of the art, and in particular, in response to the problems and needs in the art that have not yet been fully solved by currently available apparatus and methods. Accordingly, the invention has been developed to provide novel apparatus and methods for efficiently detecting thin lines in a raster image. The features and advantages of the invention will become more fully apparent from the following description and appended claims and their equivalents, and also any subsequent claims or amendments presented, or may be learned by practice of the invention as set forth hereinafter.

Consistent with the foregoing, a method for detecting and handling thin lines in a raster image is disclosed in a first example of the invention as including reading depth values for each pixel of an n×m block of pixels surrounding a substantially central pixel. Differences are then calculated for selected depth values of the n×m block of pixels to yield multiple difference values. These difference values may then be compared with multiple pre-computed difference values associated with thin lines pre-determined to pass through the n×m block of pixels. If the difference values of the pixel block substantially match the difference values of one of the pre-determined thin lines, the method may determine that the pixel block describes a thin line. The method may further preclude application of an anti-aliasing filter to the substantially central pixel of the pixel block in the event it describes a thin line. In selected examples, the difference values may be deemed to substantially match the pre-computed difference values if they are between a first set of pre-computed difference values and second set of pre-computed difference values.

In selected examples, the n×m block of pixels is an n×n block of pixels and more specifically a 3×3 block of pixels. In selected examples, the multiple difference values calculated for the pixel block are converted to binary values. These binary values may be generated by comparing the differences values with selected threshold values. A "1" or "0" may be assigned to a difference value if the difference value exceeds the threshold value. The opposite value may be assigned to the difference value if the difference is less than the threshold value. This binary difference values may then be compared with the multiple pre-computed difference values that are associated with thin lines pre-determined to pass through the n×m block of pixels.

In another example of the invention, an apparatus for detecting and processing thin lines in a raster image includes a load module to read depth values for each pixel of an n×m block of pixels, the n×m block of pixels surrounding a substantially central pixel. A calculation module may calculate the differences between selected depth values of the n×m block of pixels to yield multiple difference values. A comparator module may then compare the multiple difference values of the pixel block with pre-computed difference values. These pre-computed difference values are associated with thin lines pre-determined to pass through the n×m block of pixels. In the event the difference values of the pixel block substantially match the pre-computed difference values of a thin line, a preclusion module may preclude application of an anti-aliasing filter to the substantially central pixel.

In yet another example of the invention, an apparatus for detecting and processing thin lines in a raster image may include means for reading depth values for each pixel of an n×m block of pixels, the n×m block of pixels surrounding a substantially central pixel. The apparatus may also include means for calculating the differences between selected depth values of the n×m block of pixels to yield multiple difference values. The apparatus further includes means for comparing the plurality of difference values with pre-computed difference values associated with thin lines pre-determined to pass through the n×m block of pixels. In the event the difference values of the block of pixels substantially match the pre-computed difference values associated with a thin line, the apparatus includes means for precluding application of an anti-aliasing filter to the substantially central pixel.

It will be readily understood that the components of the invention, as generally described and illustrated in the Figures herein, may be arranged and designed in a wide variety of different configurations. Thus, the following more detailed description of the examples of the apparatus and methods of the invention, as represented in the Figures, is not intended to limit the scope of the invention, as claimed, but is merely representative of selected examples of apparatus and methods that embody or otherwise incorporate the invention.

Some of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one example," "an example," or similar language means that a particular feature, structure, or characteristic described in connection with the example may be included in at least one example of the invention. Thus, use of the phrases "in one example" or "in an example" in various places throughout this specification does not necessarily refer to the same example.

Furthermore, the described features, structures, or characteristics may be combined in any suitable manner in one or more examples. In the following description, specific details may be provided, such as examples of programming, software modules, algorithm steps, or the like, to provide a thorough understanding of examples of the invention. One skilled in the relevant art will recognize, however, that the invention can be practiced without one or more of the specific details, or with other methods or components. In other instances, well-known structures, or operations are not shown or described in detail to avoid obscuring aspects of the invention.

The illustrated examples of the invention will be best understood by reference to the drawings, wherein like parts are designated by like numerals throughout. The following description is intended only by way of example, and simply illustrates certain selected examples of apparatus and methods that are consistent with the invention as claimed herein.

Figure 1:
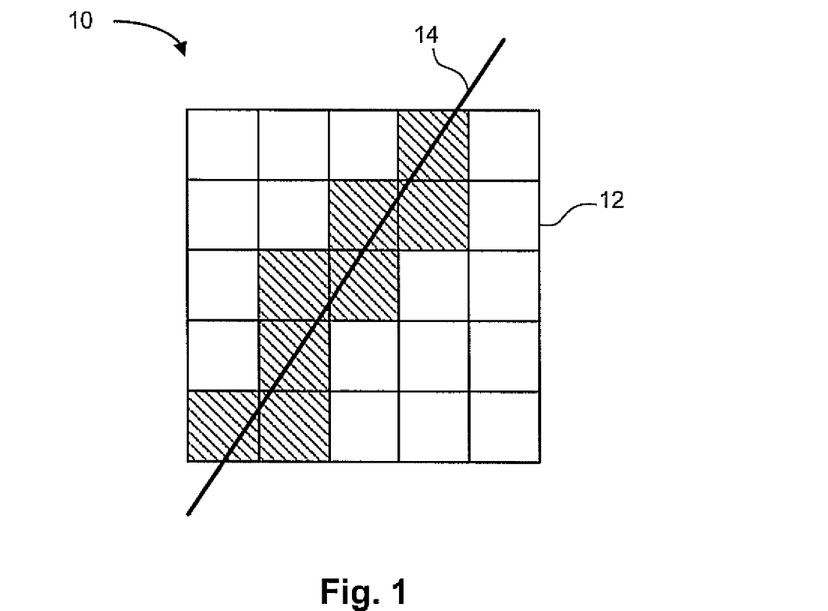
FIG. 1 is a schematic diagram showing one embodiment of a line rendering method using multiple pixels to render a line.

Referring to FIG. 1, a schematic diagram of one embodiment of a line rendering 10 using a plurality of pixels 12 to render a line 14 is illustrated. Each pixel is represented by a square, and the pixels 12 which correspond to the line 14 are shown hatched to indicate that the designated pixels 12 would be colored (e.g., different from a background color) to represent the line 14. Since the pixels 12 are square, the line rendering 10 represents the line 14 using a group of square pixels 12 arranged approximately along the path of the line 14. Depending on the thickness and orientation of the line 14, the pixels 12 may or may not be able to smoothly represent the line 14 in the pixel rendering 10.

Figure 2:
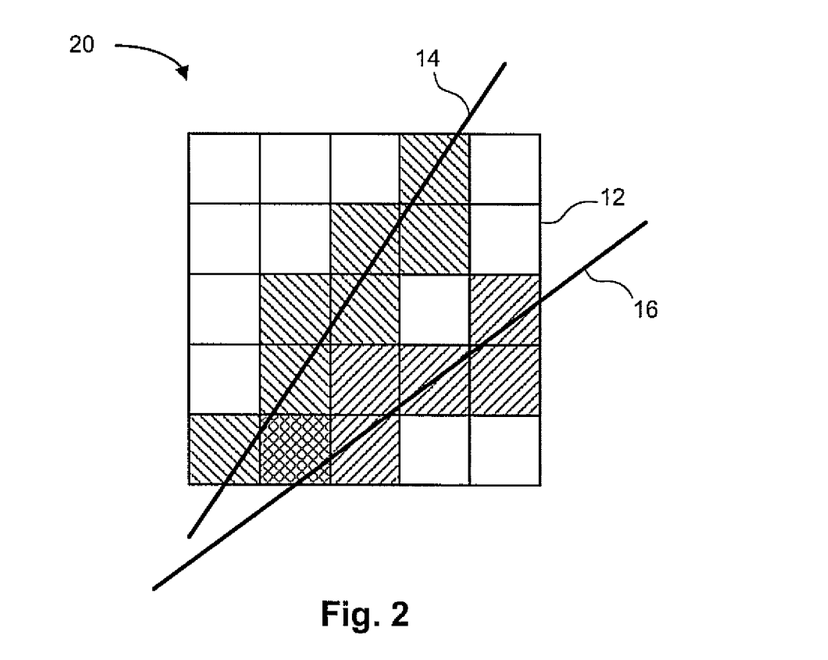
FIG. 2 is a schematic diagram showing another embodiment of a line rendering method using multiple pixels to render two lines.

Referring to FIG. 2, a schematic diagram of another embodiment of a line rendering 20 using a plurality of pixels 12 to render two lines 14, 16 is illustrated. The first line 14 is the same as the line 14 shown in FIG. 1. The second line 16 is shown using a distinct hatching pattern. In some embodiments, the distinct hatching pattern could designate a distinct color from the color used to render the first line 14. For example, the first line 14 may be rendered with blue pixels 12, and the second line 16 may be rendered with red pixels 12. Where a pixel 12 is used to render both the first line 14 and the second line 16, the pixel 12 is shown cross-hatched. In this case, the cross-hatched pixel 12 may be rendered with a blue pixel 12, a red pixel 12, or some combination of blue and red (e.g., purple).

Because of the aliasing of the line rendering 20, some representations may appear to have distortions. For example, the line rendering 20 may appear to render the first line 14 and the second line 16 in a manner that gives the appearance that the lines 14, 16 intersect near the cross-hatched pixel 12, separate moving up and to the right, and then intersect again where the corners of the differently hatched pixels 12 touch. In other words, the unhatched pixel 12 between the lines might appear to be a hole in the intersecting lines. This distortion is an effect of aliasing.

It should be noted that full scene anti-aliasing, in computer graphics, deals with the aliasing issues at the edges of objects as well as at the intersection of interpenetrating objects. The aliasing issues within an object (i.e., not at the edges) are typically resolved by using a texture re-sampling filter. Alternatively, or in addition to texture re-sampling, smooth shading (e.g., Garoud and Phong shading) may be used to resolve aliasing issues within an object. By applying different anti-aliasing filters to the object edges and intersecting areas, compared to the areas within an object, a smaller number of samples can be used to achieve a similar or better effect than using a higher number of samples with conventional anti-aliasing techniques.

Figure 3:
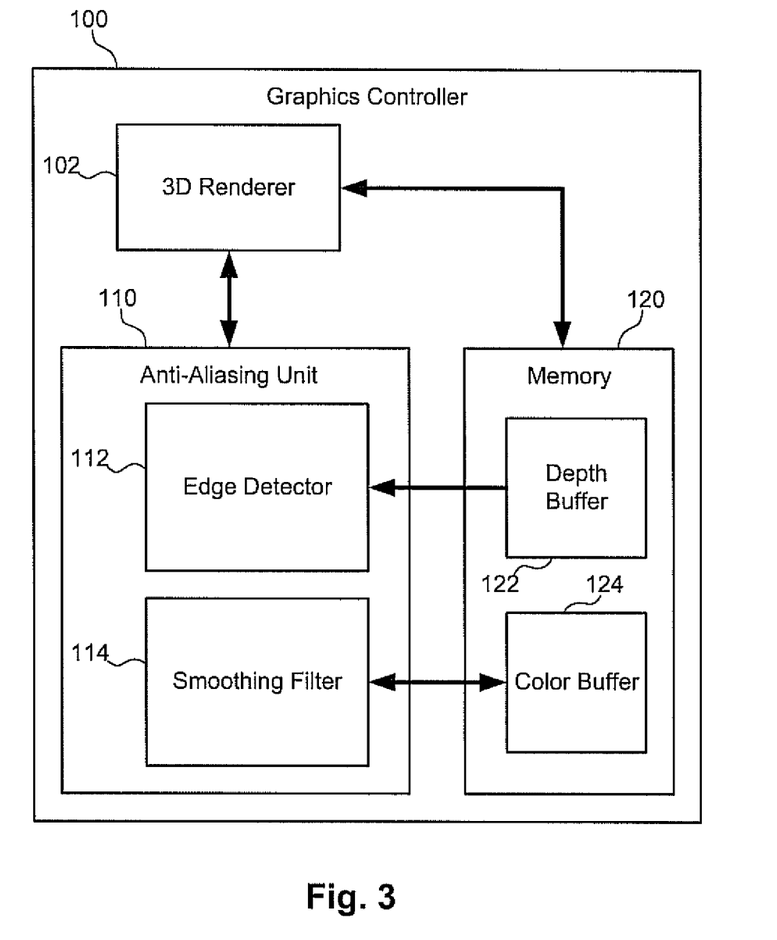
FIG. 3 is a schematic block diagram showing one embodiment of a graphics controller.

Referring to FIG. 3, a schematic block diagram of one embodiment of a graphics controller 100 having components coupled or otherwise communicating with other components is illustrated. As used herein, coupled components or entities are intended to broadly include components that are physically connected, and also includes entities that are not physically connected but that are able to communicate or otherwise transmit a signal or information by various means. The illustrated graphics controller 100 includes a three-dimensional (3D) renderer 102, an anti-aliasing unit 110, and a memory 120. The anti-aliasing unit 110 includes an edge detector 112 and a smoothing filter 114. The memory 120 includes a depth buffer 122 (also referred to as a z-buffer) and a color buffer 124. Although the graphics controller 100 is shown and described with certain components and functions, other embodiments of the graphics controller 100 may include fewer or more components and may be configured to implement more or less functionality than is described herein.

In one embodiment, the 3D renderer 102 renders, or generates, an image from a model which describes one or more 3D objects. Conventional rendering techniques are well-known in the art; hence, a more detailed description of 3D rendering is not provided herein. In one embodiment, the 3D renderer 102 stores at least some of the image information in the memory 120. In particular, the 3D renderer 102 may store depth data in the depth buffer 122 and color data in the color buffer 124. The color data includes, for example, red, blue, and green (RGB) and alpha components.

After the 3D renderer 102 renders an image, the image may be processed by the anti-aliasing unit 110 to remove aliasing distortions. In one embodiment, the anti-aliasing unit 110 implements a technique to detect edges and intersections of objects. In particular, the edge detector 112 reads the depth information from the depth buffer in order to detect the edge of an object or the intersection of multiple objects. In one embodiment, conventional edge detection techniques may be used to detect the object edges and intersections. Alternatively, the following edge detection criteria may be used to detect object edges and intersections:

$$|z2 + z0 - 2 \times z1| \geq Thresh \times (Q - z1), \text{ and}$$

$$Q = \frac{z_{far}}{z_{far} - z_{near}}, \text{ where}$$

z1 designates a depth value of a current sample or subsample, z0 and z2 designate depth values of adjacent samples or subsamples, Thresh designates a predefined threshold value, and Q is a depth coefficient. In some embodiments, the value $|z2+z0-2\times z1|$ may be referred to as a depth indicator. Furthermore, other embodiments may implement different edge detection techniques. For example, another embodiment may use the following edge detection criteria:

$$|z2+z0-2\times z1|>Thresh$$

which is a variation of the edge detection criteria described above, without the depth coefficient.

For the samples or subsamples approximately at a detected edge or intersection, the smoothing filter 114 applies a smoothing coefficient in order to achieve a high quality image. In particular, the smoothing filter 114 reads the color data from the color buffer 124 and applies a smoothing coefficient to the color data. In one embodiment, conventional smoothing techniques may be used to smooth the samples or subsamples at the detected edge or intersection. Alternatively, other smoothing techniques may be implemented, as described below.

Figure 4:
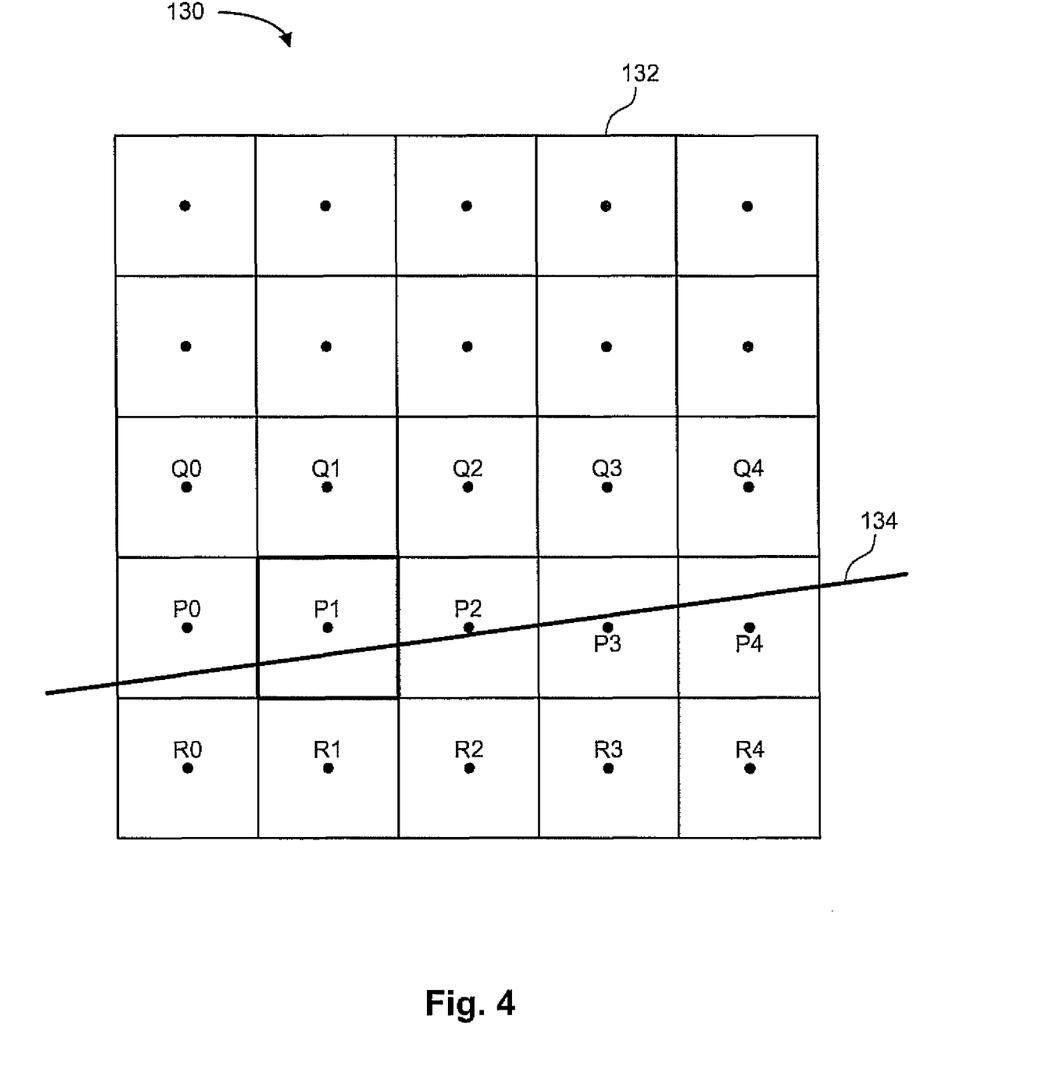
FIG. 4 is a schematic diagram of one embodiment showing pixel grouping that may be used to apply a smoothing filter at a post-rendering stage.

Referring to FIG. 4, a schematic diagram of one embodiment of a pixel grouping 130 that is used to apply a smoothing filter 114 at a post-rendering stage is illustrated. The pixel grouping 130 illustrates a single sample (shown as dots) at each of the pixels 132. For convenience, the pixels 132 are referred to herein by the same designation as the corresponding sample. For example, the pixel 132 corresponding to sample P1 is referred to as pixel P1. A detected edge 134 is also shown (indicated by a line). In another embodiment, the line could represent a detected intersection between two or more objects.

For each pixel 132 along the detected edge 134, the smoothing filter 114 applies a smoothing coefficient to mitigate the effects of aliasing. In one embodiment, the smoothing filter 114 applies the following smoothing coefficient for the current pixel 132 corresponding to the sample P1:

$$P1' = \begin{pmatrix} Q0 & Q1 & Q2 \\ P0 & P1 & P2 \\ R0 & R1 & R2 \end{pmatrix} \times \begin{pmatrix} 1/16 & 2/16 & 1/16 \\ 2/16 & 4/16 & 2/16 \\ 1/16 & 2/16 & 1/16 \end{pmatrix}$$

This equation can also be written as:

$$P1' = \frac{Q0 + 2\times Q1 + 2\times P0 + 4\times P1 + 2\times P2 + R0 + 2\times R1 + R2}{16}$$

The smoothing filter 114 then writes P1' (the new value for P1) back to the color buffer 124. In one embodiment, the smoothing filter 114 reads and writes blocks of data in the color buffer 124, rather than single values. In this scenario, the smoothing filter 114 may write all nine values for the current sample, P1, and adjacent samples, but only the value of the current sample is modified. Furthermore, as new blocks of color data are read from the color buffer 124 by the smoothing filter 114, the smoothing filter 114 may use the original color data, rather than the modified color data, to calculate subsequent pixel values.

As an example, the smoothing filter 114 reads P0-P2, Q0-Q2, and R0-R2 from the color buffer 124 and then calculates P1' as described above. Then the smoothing filter 114 writes P1', as well as the original values for P0, P2, Q0-Q2, and R0-R2, back to the color buffer 124. In one embodiment, the smoothing filter 114 writes these values to a new location in the color buffer 124 so that the original values are not altered. Next, the smoothing filter 114 reads P1-P3, Q1-Q3, and R1-R3 from the color buffer 124 and then calculates P2' using a similar smoothing function to the function described above for P1'. The smoothing filter 114 then writes P2', as well as the original values for P1, P3, Q1-Q3, and R1-R3, back to a new location in the color buffer 124. Next, the smoothing filter 114 reads P2-P4, Q2-Q4, and R2-R4 from the color buffer 124 and then calculates P3' using a similar smoothing function to the function described above for P1'. The smoothing filter 114 then writes P3', as well as the original values for P2, P4, Q2-Q4, and R2-R4, back to a new location in the color buffer 124. This procedure continues for all of the samples along the detected edge 134 or intersection. After all of the new sample values have been calculated, the original values in the color buffer 124 may be overwritten with the new values.

Figure 5:
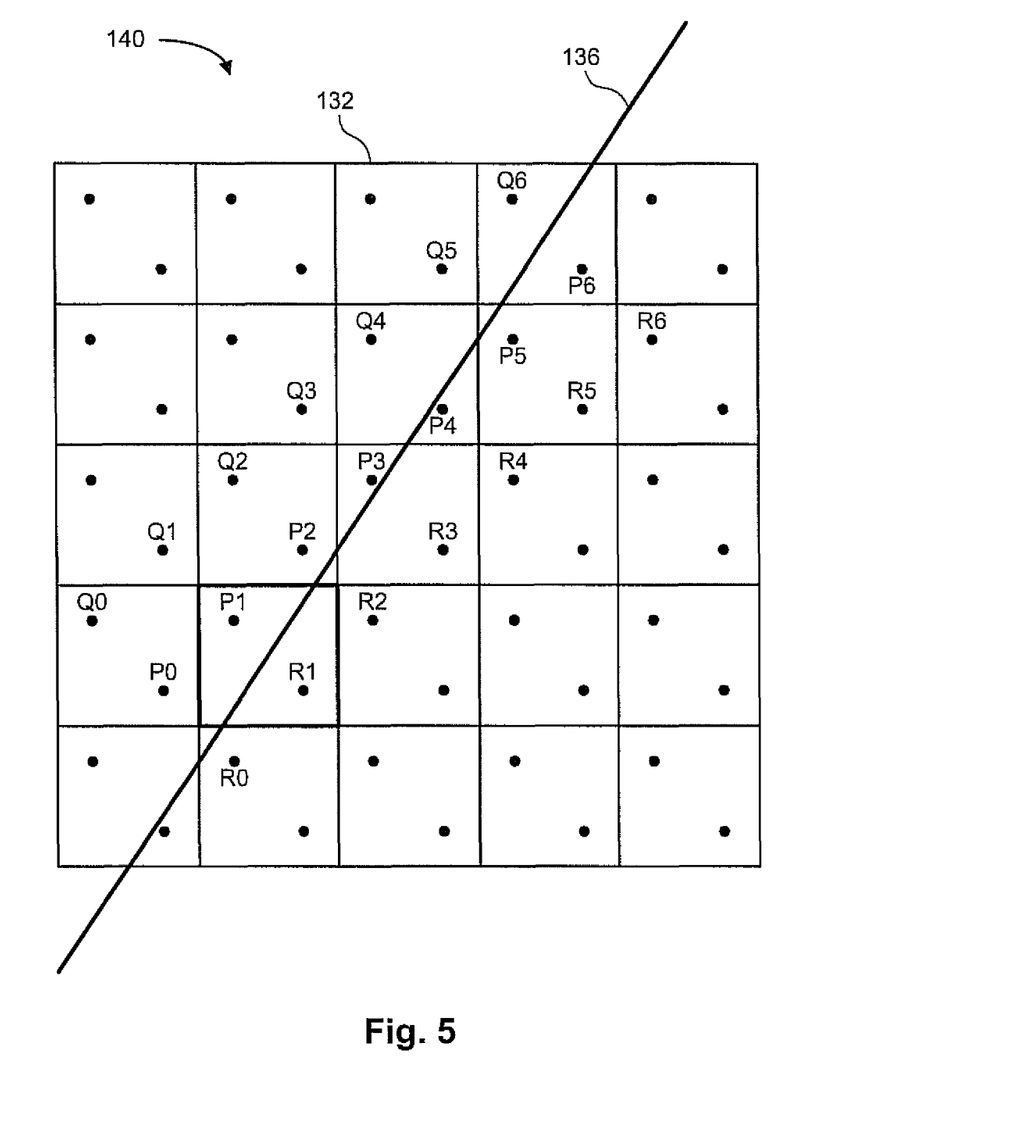
FIG. 5 is a schematic diagram of another embodiment showing pixel grouping that may be used to apply a smoothing filter at a post-rendering stage.

Referring to FIG. 5, a schematic diagram of another embodiment of a pixel grouping 140 that is used to apply a smoothing filter 114 at a post-rendering stage is illustrated. The pixel grouping 140 illustrates two subsamples (shown as dots) at each of the pixels 132. Since the pixel grouping 140 uses multiple subsamples for each pixel 132, the pixels 132 are designated herein by the corresponding subsamples. For example, the pixel 132 corresponding to subsamples P1 and R1 is designated herein as pixel PR1. However, this designation is arbitrary and other embodiments may implement other nomenclatures. FIG. 5 also shows a detected edge 136 (indicated by a line). In another embodiment, the line could represent a detected intersection between two or more objects.

For each pixel 132 along the detected edge 136, the smoothing filter 114 applies a smoothing coefficient to mitigate the effects of aliasing. In one embodiment, the smoothing filter 114 applies the following smoothing coefficient for the current pixel, PR1, corresponding to the subsamples P1 and R1:

$$PR1' = \begin{pmatrix} P0 & P1 & P2 \\ R0 & R1 & R2 \end{pmatrix} \times \begin{pmatrix} 1/8 & 2/8 & 1/8 \\ 1/8 & 2/8 & 1/8 \end{pmatrix}$$

This equation can also be written as:

$$PR1' = \frac{P0 + 2 \times P1 + P2 + R0 + 2 \times R1 + R2}{8}$$

The smoothing filter 114 then writes the new value for pixel PR1 back to the color buffer 124. In one embodiment, the smoothing filter 114 may write values for multiple pixels, but only the value of the current pixel is modified. Furthermore, as new blocks of color data are read from the color buffer 124 by the smoothing filter 114, the smoothing filter 114 may use the original color data, rather than the modified color data, to calculate subsequent pixel values.

As an example, the smoothing filter 114 reads P0-P2 and R0-R2 from the color buffer 124 and then calculates PR1' as described above. Then the smoothing filter 114 writes PR1' back to the color buffer 124. Next, the smoothing filter 114 reads P1-P3 and Q1-Q3 from the color buffer 124 and then calculates QP2' using a similar smoothing function to the function described above for PR1'. The smoothing filter 114 then writes QP2' back to a new location in the color buffer 124. Next, the smoothing filter 114 reads P2-P4 and R2-R4 from the color buffer 124 and then calculates PR3' using a similar smoothing function to the function described above for PR1'. The smoothing filter 114 then writes PR3' back to a new location in the color buffer 124. This procedure continues for all of the pixels 132 along the detected edge 136 or intersection. After all of the new pixel values have been calculated, the original values in the color buffer 124 may be overwritten with the new values.

In one embodiment, the type of smoothing filter coefficient applied depends on the type of sampling that is used. Although examples are provided above to show possible smoothing filter coefficients for supersampling and 2× multisampling, other smoothing filter coefficients may be used for other sampling variations.

Figure 6:
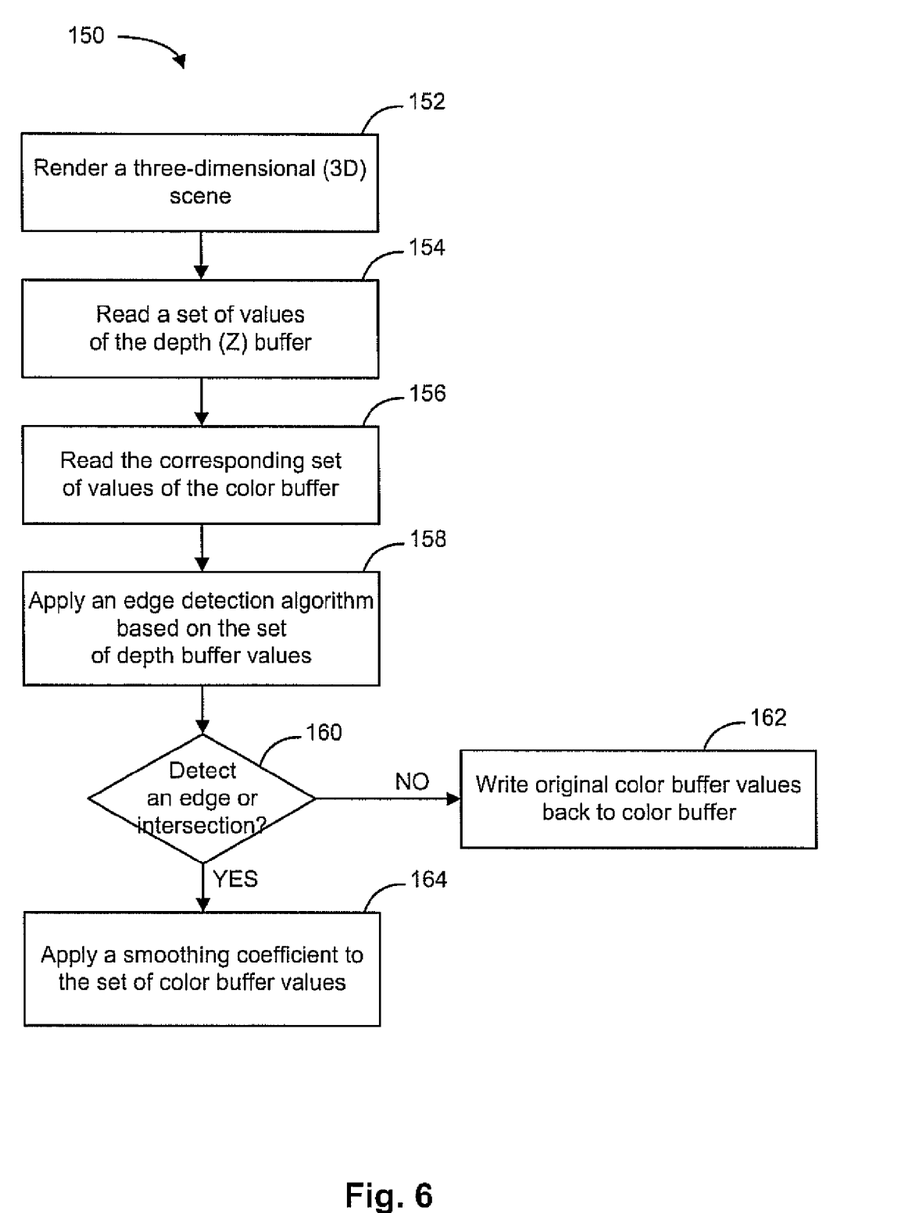
FIG. 6 is a flowchart showing one embodiment of a method for rendering an image.

Referring to FIG. 6, a schematic flowchart diagram of one embodiment of a method 150 for rendering an image is illustrated. Some embodiments of the method 150 may be implemented in conjunction with the graphics controller 100 and the anti-aliasing unit 110 described above. While an embodiment of the method 150 is described with reference to the graphics controller 100 and the anti-aliasing unit 110, other embodiments may be implemented in conjunction with other computer graphics systems.

The illustrated method 150 begins as the 3D renderer 102 renders 152 a 3D scene. As described above, rendering a 3D scene may include executing graphical commands to render one or more graphical objects. The anti-aliasing unit 110 then reads 154 a set of depth values from the depth buffer 122. The anti-aliasing unit 110 also reads 156 a corresponding set of color values from the color buffer 124. Using the depth values, the edge detector 112 applies 158 an edge detection algorithm to determine 160 if there is an object edge or intersection. If the edge detector 112 does not detect an object edge or intersection, then the corresponding color data is written 162 back to the color buffer 124 unchanged. In one embodiment, any corresponding data that might be read by the smoothing filter 114 is simply written back out unchanged. Otherwise, if the edge detector 112 detects an edge or intersection, then the smoothing filter 114 applies 164 a smoothing coefficient to the corresponding color values. As described above, the smoothing filter 114 may apply different types of smoothing coefficients depending on the type of edge or intersection that is detected, and so forth. The depicted method 150 then ends.

Embodiments of the system and method described herein facilitate improved anti-aliasing compared to conventional anti-aliasing techniques. Additionally, some embodiments may be used in conjunction with one or more conventional anti-aliasing techniques. For example, one embodiment may be used as an improvement of conventional multisample anti-aliasing.

Furthermore, some embodiments provide a relatively high image quality for a small number of samples. In this way, the image quality may be comparable to an image rendered using a conventional anti-aliasing technique and a higher number of samples. For example, an embodiment using 1 sample per pixel may achieve an image quality that is better than an image processed using 2-sample MSAA. Similarly, an embodiment using 2 samples per pixel may achieve an image quality that is about the same as an image processed using 4-sample MSAA. Furthermore, an embodiment using 4 samples per pixel may achieve an image quality that is about the same as an image processed using 6-sample MSAA. Hence, various embodiments may be implemented to provide a high quality image at a relatively low complexity and cost.

Figure 7:
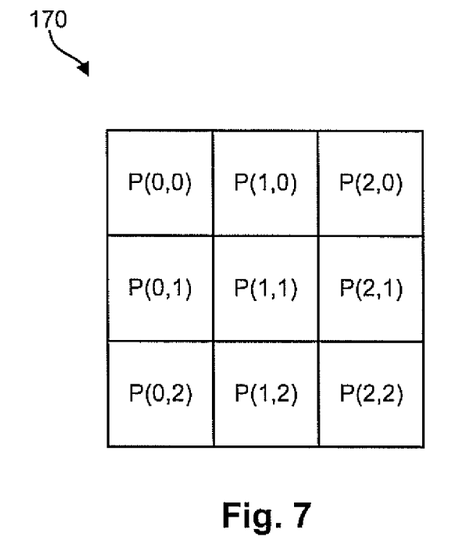
FIG. 7 is a schematic block diagram showing a pixel block and a pixel numbering convention used in a thin-line detection apparatus and method.

Referring to FIG. 7, as mentioned, anti-aliasing techniques are generally effective for edges of relatively large areas having a uniform or substantially uniform color. Thin lines having a width of one pixel or less may be blurred or dissolved into the background when filtered by various anti-aliasing algorithms, including the anti-aliasing algorithms disclosed herein. Thus, it may be advisable to exclude thin lines or other small features from processing by anti-aliasing algorithms. This will ideally maintain the sharpness and distinctiveness of thin lines relative to a background color.

In selected examples, to detect a thin line passing through a pixel P(x, y), a method in accordance with the invention may examine the pixels surrounding P(x, y), such as an n×m block of pixels surrounding pixel P(x, y) and more particularly an n×n block of pixels surrounding pixel P(x, y). In this example, a 3×3 block of pixels surrounding pixel P(x, y) is evaluated. For example, when x=1 and y=1, we get a 3×3 pixel block 170 having a central pixel P(1, 1), as shown in FIG. 7.

Figure 8:
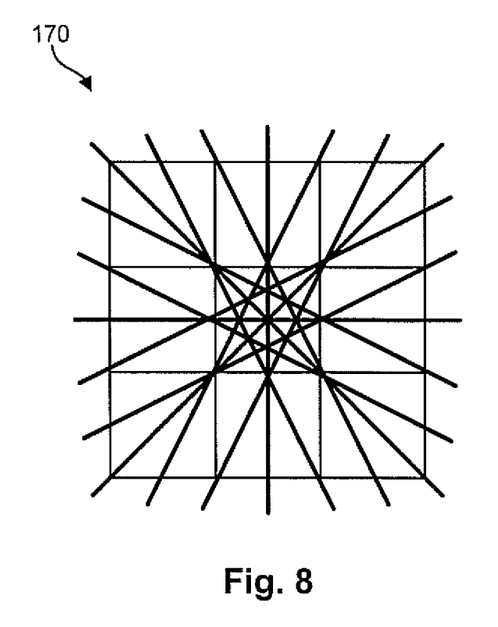
FIG. 8 is a schematic block diagram showing various thin lines that may pass through the pixel block illustrated in FIG. 7.
Figure 9A:
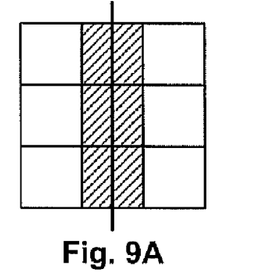
FIGS. 9A through 9L show various pixel patterns that may be produced by rasterizing the thin lines passing through the pixel block of FIG. 7.
Figure 9B:
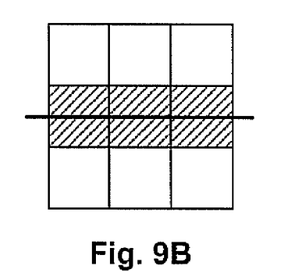
Figure 9C:
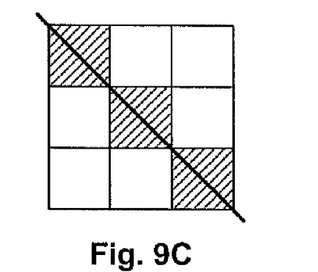
Figure 9D:
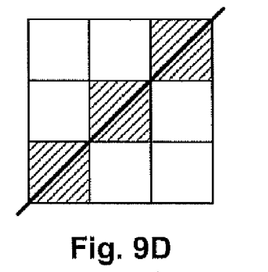
Figure 9E:
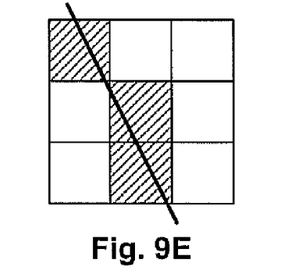
Figure 9F:
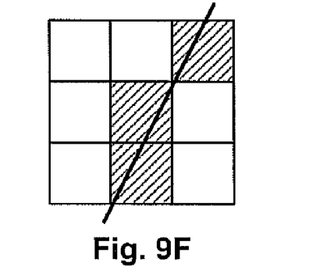
Figure 9G:
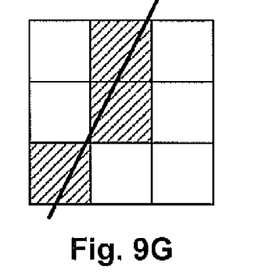
Figure 9H:
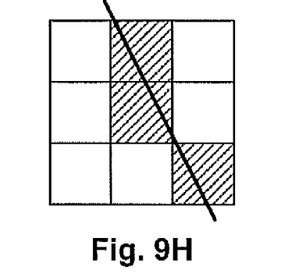
Figure 9I:
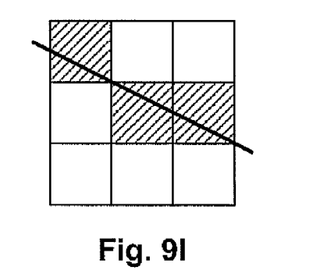
Figure 9J:
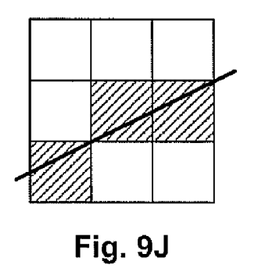
Figure 9K:
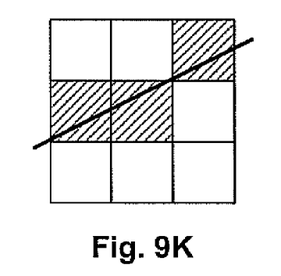
Figure 9L:
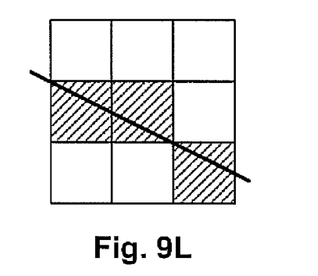

Referring to FIG. 8, prior to evaluating the pixel block 170 to make a determination of whether a thin line passes through the block 170, various different scenarios may be determined for thin lines passing through the central pixel P(x, y). For example, each of the twelve thin lines illustrated in FIG. 8 may, after rasterization, create different pixel patterns that include the central pixel P(x, y). Although other thin lines, in addition to the twelve substantially straight lines of FIG. 8, may also pass through the pixel block 170, the twelve illustrated lines may provide a set of thin lines that are determined to be the most likely to pass through the central pixel P(x, y).

Referring to FIGS. 9A through 9L, for example, each of the twelve thin lines shown in FIG. 8 may create the illustrated pixel patterns after they have been rasterized (converted to pixels). The vector format of the lines is shown superimposed over the pixel patterns for illustrative purposes. When evaluating the depth value of each of the pixels, the white pixels may belong to a background plane and thus be expected to have substantially the same or a similar depth value. The cross-hatched pixels, on the other hand, may have a depth value that differs significantly from the white pixels because they belong to a thin line lying in a different plane than the background plane. Similarly, the cross-hatched pixels may also have depth values that are substantially equal or similar to each other because they belong to the same line.

Although other patterns may also potentially represent thin lines passing through the pixel block 170, the illustrated patterns may be deemed, for efficiency purposes, to be the only patterns that are considered thin lines. That is, other patterns, regardless of whether they represent a thin line or not, may be deemed to represent patterns other than thin lines. Nevertheless, in other examples, other patterns may be deemed to represent thin lines, such as patterns representing curved lines, and may be included in the set in addition to the twelve illustrated patterns. In other examples, selected patterns may be deleted from the illustrated set of patterns to reduce the size of the set and thereby increase speed or efficiency, although it may also potentially diminish accuracy.

Figure 10:
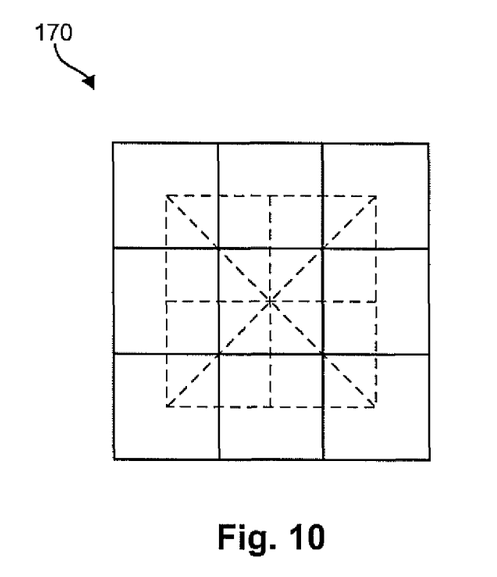
FIG. 10 is a schematic block diagram showing various difference values that may be calculated for a pixel block to detect a thin line passing through the pixel block.

Referring to FIG. 10, once a set of potential thin-line patterns (as illustrated in FIGS. 9A through 9L) is determined, various calculations may be performed on the depth values of the pixel patterns to yield multiple difference values for each thin-line pattern. As will be explained in more detail hereafter, these same calculations may also be performed on a candidate pixel pattern to yield multiple difference values. If the difference values of the candidate pattern substantially match the difference values of one of the pre-determined patterns (the patterns illustrated in FIGS. 9A through 9L), the candidate pattern may be deemed to represent a thin line and the central pixel P(x, y) may be excluded from processing by an anti-aliasing algorithm.

For example, the following sixteen calculations may be performed on each of the predetermined thin-line patterns of FIGS. 9A through 9L to yield sixteen difference values D(j) for each pattern:

$$D(j)=|Z(x-1,y-1+j)+Z(x+1,y-1+j)-2Z(x,y-1+j)|, j=0,1,2$$

$$D(j+3)=|Z(x-1+j,y-1)+Z(x-1+j,y+1)-2Z(x-1+j,y)|, j=0,1,2$$

$$D(6)=|Z(x-1,y-1)+Z(x+1,y+1)-2Z(x,y)|$$

$$D(7)=|Z(x+1,y-1)+Z(x-1,y+1)-2Z(x,y)|$$

$$D(j+8)=|Z(x-1+j,y-1)+Z(x+j,y-1)-(Z(x-1+j,y+1)+Z(x+j,y+1))|, j=0,1$$

$$D(j+10)=|Z(x-1+j,y-1)-Z(x+j,y-1)-(Z(x-1+j,y+1)Z(x+j,y+1))|, j=0,1$$

$$D(j+12)=|Z(x-1,y-1+j)+Z(x-1,y+j)-(Z(x+1,y-1+j)+Z(x+1,y+j))|, j=0,1$$

$$D(j+14)=|Z(x-1,y-1+j)-Z(x-1,y+j)-(Z(x+1,y-1+j)-Z(x+1,y+j))|, j=0,1$$

In this example, Z(r, s) is the depth value corresponding to pixel P(r, s). In general, the sixteen difference values D(j) calculated above are selected to measure the difference in depth values for various pixels of the pixel block 170. The first eight of the above difference values are measured in the eight directions indicated by the dotted lines of FIG. 10. In general, these difference values measure the difference between a pixel and its neighbor pixels on either side of the pixel in different directions. The remaining eight difference values are cross difference values measured in various directions. These sixteen difference values may then be converted to a sixteen-bit binary value (mask) by comparing each difference value D(j) with a preset threshold (Thresh) using the following equation or code segment:

$$\text{mask}=(2^0D(0)>\text{Thresh? 1:0})+2^1(D(1)>\text{Thresh? 1:0})+2^2(D(2)>\text{Thresh? 1:0})+\ldots+2^{15}(D(15)>\text{Thresh? 1:0})$$

The preset threshold Thresh may be selected to indicate at what point a depth value of an evaluated pixel is deemed to be different from its surrounding pixels. In general, if the difference value exceeds the preset threshold value, the above equation may assign the corresponding bit of the sixteen bit mask a value of "1". Conversely, if the difference value is less than or equal to the preset threshold value, the above equation may assign the corresponding bit a value of "0".

In selected embodiments, two sets of difference values may be calculated for each pre-determined thin-line pattern illustrated in FIGS. 9A through 9L. A first set of calculations may be performed for a simple case, where each pixel associated with a thin line has a depth value that is substantially equal. A second set of calculations may be performed for a more complex case, where two or more pixels associated with the same thin line have depth values that differ significantly. This may occur, for example, where a thin line is non-parallel relative to the viewing plane of the raster image. The difference values for a candidate thin-line pattern may then be compared with the first and second sets of difference values of the pre-determined thin-line pattern. If the difference values for the candidate pixel pattern are equal to or between the difference values of the first and second sets, the candidate pattern will be deemed to match the pre-determined thin line pattern.

Figure 11:
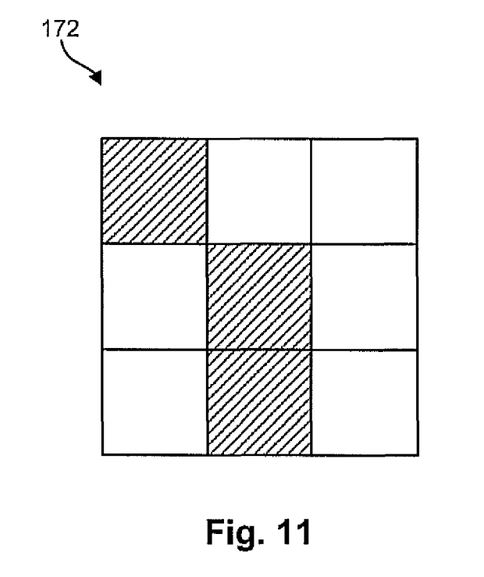
FIG. 11 is a schematic block diagram showing one embodiment of a candidate pixel block that may be evaluated to determine if it describes a thin line.

For example, consider the candidate line pattern 172 illustrated in FIG. 11. To determine if the pattern describes a thin line, sixteen difference values D(j) may be calculated for the pattern using the equations described in association with FIG. 10. A sixteen-bit mask may then be generated for the candidate line pattern 172 by comparing each of the sixteen difference values with a preset threshold. Once the mask is generated, the mask may be compared to the sixteen-bit values generated for each of the pre-determined line patterns. More specifically, the mask may be compared to the first and second sets of sixteen-bit difference values for each of the pre-determined thin-line patterns to determine if the mask is between the first and second sets, as indicated by the following code segment:

```
For(j = 0, j<12,j++)
{if( (mask | lineEdgeMaskSample[j+12]) == lineEdgeMaskSample [j+12]
&&
(mask & lineEdgeMaskSample [j]) == lineEdgeMaskSample [j] )
return lineEdge;}
where
lineEdgeMaskSample[24] = {0x00c7, 0xaedf, 0xadf7, 0xffbf, 0x5edf,
0x5df7, 0xff7f, 0x00f8, 0xeafb, 0xdafe, 0xd5fe, 0xe5fb, 0x0fc7, 0xafdf,
0xaff7, 0xffbf, 0x5fdf, 0x5ff7, 0xff7f, 0xf0f8, 0xfafb, 0xfafe, 0xf5fe,
0xf5fb};
```

In the above code segment, the first and second sets of difference values are stored in a twenty-four-element array (i.e., "lineEdgeMaskSample[24]"). Two sixteen-bit values are stored for each of the twelve pre-determined thin line patterns, with one corresponding to the simple case and one corresponding to the complex case as previously discussed herein (e.g., "0x00c7" is the sixteen-bit value for a simple case and "0x0fc7" is the sixteen-bit value for a complex case for a first pre-determined thin line pattern). The "for" loop then determines whether the sixteen-bit mask ("mask") for the candidate thin-line pattern is between the sixteen-bit difference values for the simple case and the sixteen-bit difference values for the complex case for each of the twelve pre-determined thin line patterns. If the candidate thin-line pattern is between one of these pairs of sixteen-bit difference values, the candidate thin-line pattern may be deemed to match the corresponding thin-line pattern and pixel P(x, y) and may be excluded from the anti-aliasing algorithm.

In an alternative and perhaps simpler embodiment of the invention, the sixteen-bit mask for the candidate line pattern may be compared to a single sixteen-bit difference value for a pre-determined thin-line pattern (possibly corresponding to the simple case for the thin-line pattern as described above). If the sixteen-bit mask exactly or substantially matches the sixteen-bit value for the pre-determined thin-line pattern, the candidate thin-line pattern may be deemed to match the thin-line pattern and pixel P(x, y) may be excluded from the anti-aliasing algorithm.

Figure 12:
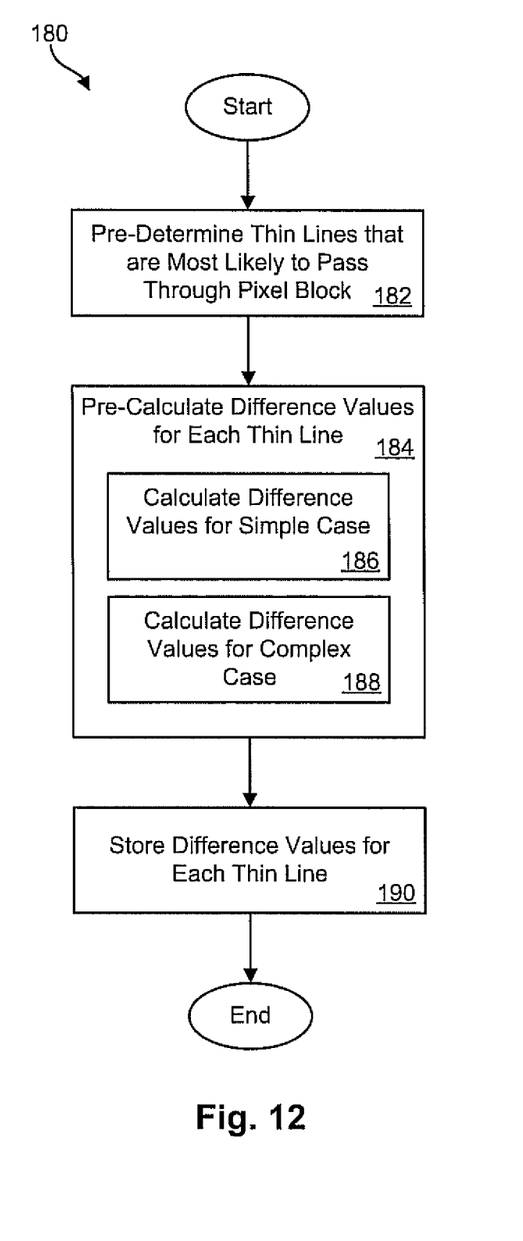
FIG. 12 is a flow chart showing one embodiment of a method for determining difference values for various pre-determined thin lines.

Referring to FIG. 12, in selected examples, a method for detecting thin lines in a raster image may initially include pre-determining 182 which thin lines are most likely to pass through a pixel block, as was discussed in association with FIG. 8. The number and orientation of thin lines may include more or fewer lines than those illustrated in FIG. 8. Difference values D(j) may then be pre-calculated 184 for each thin line in the set. This may include calculating 186 the difference values for a simple case (i.e., where the depth values for the thin line are substantially equal) and/or calculating 188 the difference values for a more complex case (i.e., where the depth values for the thin line differ significantly) as previously described herein. These difference values may be converted to sixteen-bit binary values by comparing the difference values D(j) with preset thresholds. These values may then be stored 190 for each thin line.

Figure 13:
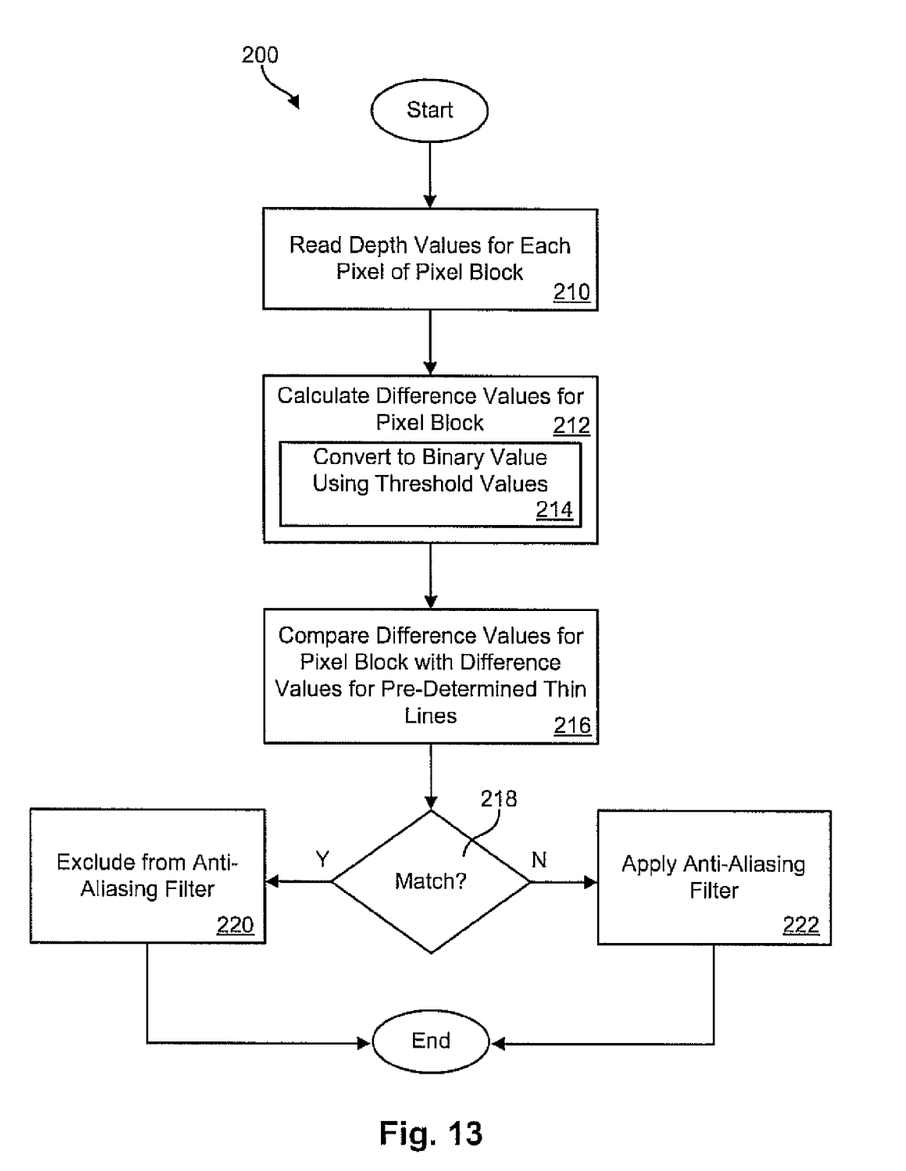
FIG. 13 is a flow chart showing one embodiment of a method for comparing a pixel block with the pre-determined thin lines to determine if the pixel block describes a thin line.

Referring to FIG. 13, to detect a thin line in a candidate pixel pattern, a method 200 may include reading 210 depth values for each pixel of a block of pixels, such as a 3×3 block of pixels. Difference values D(j) may then be calculated 212 for the pixel block. These difference values may be converted 214 to a sixteen-bit binary mask by comparing the difference values D(j) with a preset threshold, as was previously described. Once the binary mask is generated, the sixteen-bit difference values associated with the candidate pixel pattern may be compared 216 with the sixteen-bit difference values for each of the pre-determined thin line patterns. If, at a decision step 218, there is a match, the method 200 may include excluding 220 the central pixel P(x, y) of the pixel block from an anti-aliasing filter. If, on the other hand, a match is not encountered, the method 200 may include applying 222 an anti-aliasing filter to the central pixel P(x, y).

Figure 14:
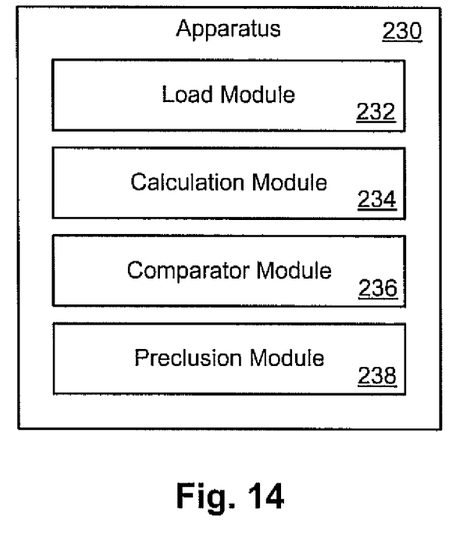
FIG. 14 is a high-level block diagram of one embodiment of an apparatus for detecting thin lines in accordance with the invention.

Referring to FIG. 14, in selected embodiments, an apparatus 230 for detecting and processing thin lines in a raster image includes a load module 232 to read depth values for each pixel of an n×m block of pixels, the n×m block of pixels surrounding a substantially central pixel. A calculation module 234 may calculate the differences between selected depth values of the n×m block of pixels to yield multiple difference values. A comparator module 236 may then compare the multiple difference values of the pixel block with pre-computed difference values. These pre-computed difference values are associated with thin lines pre-determined to pass through the n×m block of pixels. In the event the difference values of the pixel block substantially match the pre-computed difference values of a thin line, a preclusion module 238 may preclude application of an anti-aliasing filter to the substantially central pixel.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for detecting and processing thin lines in a raster image, the method comprising:
    calculating a plurality of difference value sets each calculated based on a possible path of a thin line passing through a central pixel of any n×m block of pixels;
    for each pixel of a plurality of pixels in an image:
        reading depth values for adjacent pixels of an n×m block of pixels surrounding the each pixel, wherein both n and m are greater than or equal to 3;
        calculating the difference between selected depth values of the n×m block of pixels to yield a plurality of difference values;

comparing the plurality of difference values to the plurality of difference value sets; and precluding, via a graphics controller, application of an anti-aliasing filter to the each pixel based on the comparing of the plurality of difference values to the plurality of difference value sets.

2. The method of claim 1, wherein n is equal to m.

3. The method of claim 1, wherein n and m are both equal to 3.

4. The method of claim 1, wherein the plurality of difference values are a plurality of binary values.

5. The method of claim 4, wherein the plurality of binary values is generated by comparing the plurality of difference values with threshold values.

6. The method of claim 1, wherein comparing the plurality of difference value sets to the plurality of difference values further comprises determining whether the plurality of difference values are between a first set of pre-computed difference values and a second set of pre-computed difference values.

7. The method of claim 6, wherein the first set of pre-computed difference values correspond to simple possible paths through the central pixel and the second set of pre-computed difference values corresponds to complex possible paths through the central pixel.

8. The method of claim 7, wherein the complex possible paths have greater depth variations then the simple possible paths.

9. The method of claim 1, wherein the thin line is a line with a width of one pixel.

10. An apparatus for detecting and processing thin lines in a raster image, the apparatus comprising:
   a load module to read depth values for each pixel of an n×m block of pixels surrounding a central pixel, wherein both n and m are greater than or equal to 3;
   a calculation module to calculate the differences between selected depth values of the n×m block of pixels to yield a plurality of difference values;
   a comparator module to compare the plurality of difference values with a plurality of pre-computed difference value set, each difference value set associated with a thin line pre-determined to pass through the n×m block of pixels; and
   a preclusion module to preclude application of an anti-aliasing filter to the central pixel in the event the plurality of difference values matches a difference value set of the plurality of pre-computed difference value set.

11. The apparatus of claim 10, wherein n is equal to m.

12. The apparatus of claim 10, wherein n and m are both equal to 3.

13. The apparatus of claim 10, wherein the plurality of difference values are a plurality of binary values.

14. The apparatus of claim 13, wherein the calculation module computes the plurality of binary values by comparing the plurality of difference values with threshold values.

15. The apparatus of claim 10, wherein matching a difference value set of the plurality of pre-computed difference value sets comprises being between a first set of pre-computed difference values and a second set of pre-computed difference values.

16. The apparatus of claim 15, wherein the first set of pre-computed difference values corresponds to a first thin line following a first path through the n×m block of pixels and the second set of pre computed difference values corresponds to a second thin line following the first path through the n×m block of pixels but having different depth values than the first thin line.

17. The apparatus of claim 10, wherein the thin line is a line with a width of one pixel.

18. The apparatus of claim 10, wherein the plurality of difference value sets are each associated with a different thin line passing through the n×m block of pixels.

19. The apparatus of claim 18, wherein each thin line passes through the central pixel.

20. An apparatus for detecting and processing thin lines in a raster image, the apparatus comprising:
   means for reading depth values for each pixel of an n×m block of pixels surrounding a central pixel, wherein both n and m are greater than or equal to 3;
   means for calculating the differences between selected depth values of the n×m block of pixels to yield a plurality of difference values;
   means for comparing the plurality of difference values with a plurality of pre-computed difference value sets, each pre-computed difference value set associated with different a thin line pre-determined to pass through the n×m block of pixels; and
   means for precluding application of an anti-aliasing filter to the central pixel in the event the plurality of difference values matches a pre-computed difference value set of the plurality of pre-computed difference value sets.

* * * * *